Dec. 5, 1933.  B. J. UKROPINA  1,938,232
CONCRETE PIPE JOINT
Filed May 2, 1933  2 Sheets-Sheet 1
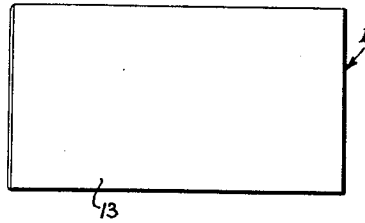
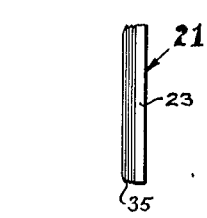
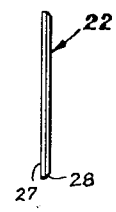
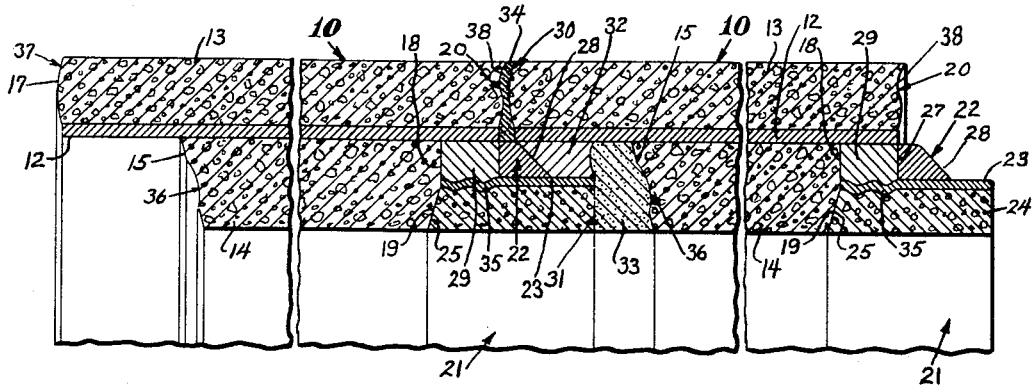
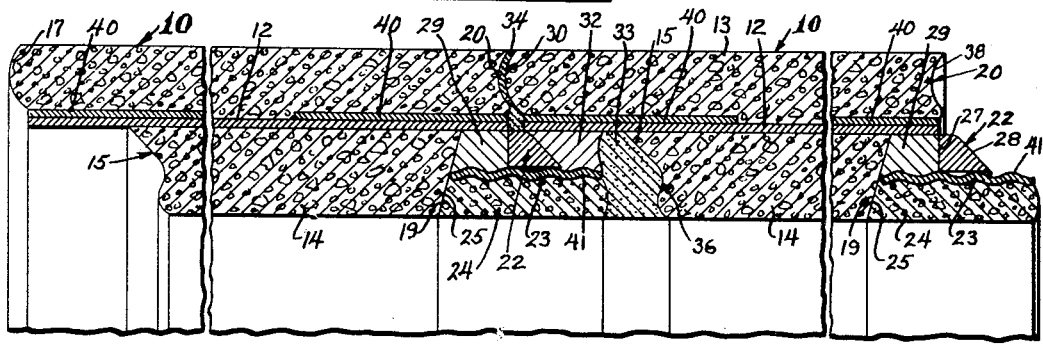
INVENTOR.
B. J. UKROPINA.
BY
ATTORNEYS.

Dec. 5, 1933.  B. J. UKROPINA  1,938,232
CONCRETE PIPE JOINT
Filed May 2, 1933  2 Sheets-Sheet 2
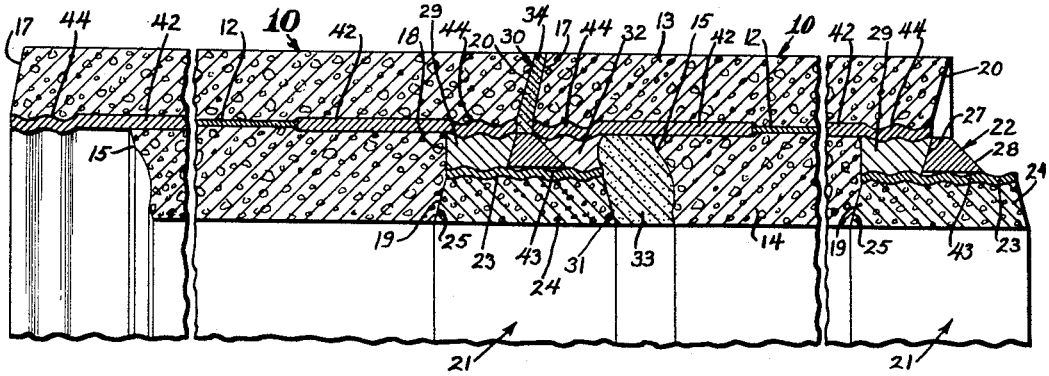
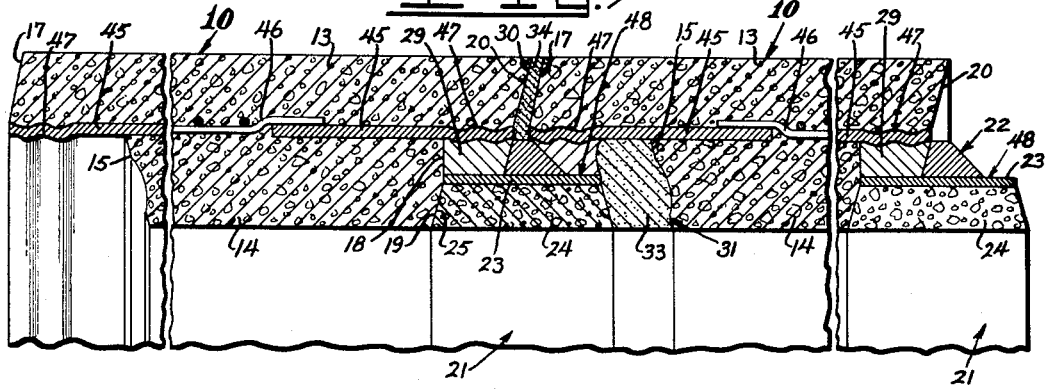
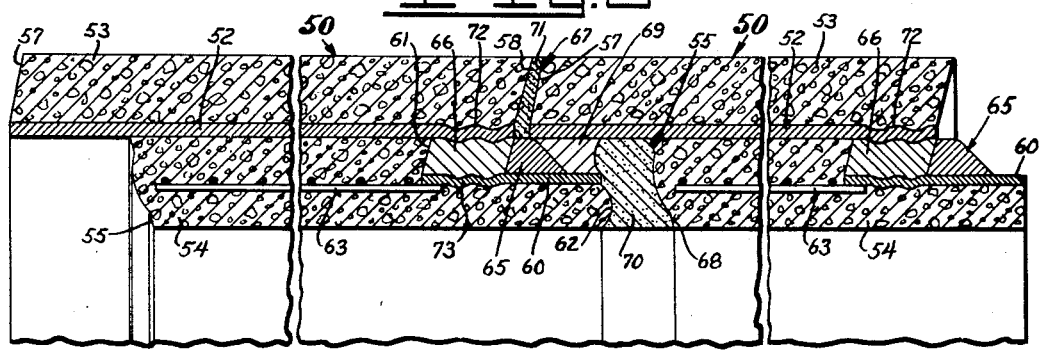
INVENTOR.
B.J. UKROPINA.
BY
ATTORNEYS.

Patented Dec. 5, 1933

1,938,232

UNITED STATES PATENT OFFICE 1,938,232

CONCRETE PIPE JOINT

Bozidar J. Ukropina, Los Angeles, Calif.

Application May 2, 1933. Serial No. 668,969

17 Claims. (Cl. 72—53)

This invention relates to improvements in concrete pipes.

The general object of the invention is to provide an improved concrete pipe joint.

Another object of the invention is to provide a concrete pipe joint wherein the joint is made leak-proof by novel means.

A further object of the invention is to provide a concrete pipe joint including packing material and wherein means is provided for determining upon which surface of the packing the pipes will move.

A still further object of the invention is to provide a concrete pipe joint wherein a portion of the joint associated with one pipe may be packed as at the place of manufacture before the pipe is joined to another and thereafter the other portion of the joint packed when the pipe is joined to another pipe.

Other objects and the advantages of this invention will be apparent from the following description taken in connection with the accompanying drawings wherein:

Fig. 1 is a side elevation of a concrete pipe embodying the features of my invention;

Fig. 2 is a side elevation of the collar forming a portion of my improved joint;

Fig. 3 is a side elevation of the centering ring forming a portion of my improved joint;

Fig. 4 is an enlarged fragmentary longitudinal section through two lengths of concrete pipe showing my improved joint;

Figs. 5, 6 and 7 are views similar to Fig. 4 showing slight modifications in the joint; and, Fig. 8 is an enlarged fragmentary longitudinal section through two sections of a modified form of concrete pipe showing a slightly modified form of joint.

Referring to the drawings by reference characters I have indicated a length of concrete pipe embodying the features of my invention generally at 10. As shown the pipe 10 includes a metal reinforcing tube 12 embedded between an outer layer of concrete 13, and an inner layer of concrete 14. At one end of the pipe the inner layer of concrete 14 is set back from the end of the metal tube 12 as indicated at 15. The end of the outer layer of concrete 13 adjacent the end 15 of the inner layer extends to the end of the metal tube 12 as indicated at 17. The inner layer of concrete 14 opposite the end 15 is set back from the end of the metal tube 12 and includes a plane surface 18 adjacent the tube 12 and an inwardly beveled surface 19. Both the surface 18 and the surface 19 are preferably painted with a water-proof paint. The end of the outer layer of concrete 13 adjacent the end 18 of the inner layer extends to the end of the metal tube 12 as indicated at 20.

In forming my improved joint I use a collar 21 which is shown in detail in Fig. 2 and a centering ring 22 which is shown in detail in Fig. 3. As shown the collar 21 comprises a metal band 23 having a concrete ring 24 cast therein. The external diameter of the collar 21 is less than the internal diameter of the metal tube 12 of the pipe while the internal diameter of the collar corresponds to the internal diameter of the pipe. One face of the concrete ring 24 of the collar 21 is beveled as at 25 to correspond to the beveled surface 19 of the pipe 10 and the opposite surface of the concrete ring is plane. Both end faces of the collar 21 are preferably painted with a water-proof paint similar to the surfaces 18 and 19 of the pipe 10.

The centering ring 22 may be formed of metal as shown or it may be formed of concrete, if desired. The external diameter of the centering ring 22 is approximately the same diameter as the internal diameter of the metal tube 12 of the pipe and the internal diameter of the centering ring is approximately the same diameter as the external diameter of the metal band 23 of the collar 21. As shown the centering ring 22 includes a plane face 27 and the opposite face is beveled as indicated at 28.

In operation the collar 21 and the centering ring 22 are adapted to be assembled with a section of the pipe 10 at the place of manufacture. The collar 21 is positioned in the end of the pipe 20 with the beveled surface 25 of the collar abutting the beveled surface 19 of the pipe. A caulking material 29, such as lead wool is then packed in the space between the metal tube 12 of the pipe 10 and the metal band 23 of the collar 21 and extends from the end of the inner layer of concrete to approximately flush with the end of the metal tube 12. The centering ring 22 is then positioned on the collar 21 with the plane face 27 thereof engaging the caulking material 29.

When two sections of the pipe 10 are to be joined the end 15 of one section is placed adjacent the end 20 of another section and then the end 15 of the one section is moved towards the other section. As the end 15 moves into position the beveled face 28 of the centering ring 22 correctly centers the two sections of pipe. When two sections of pipe are thus joined a small space 30 is left between the ends 17 and 20 of the adjoining pipes. In this joined position of the pipes the metal tube 12 of one pipe section at the end 15 thereof overhangs the portion of the collar 21 at the side of the centering ring opposite the packing 29 and a space 31 is left between the face of the collar and the pipe end 15. A caulking material 32, such as lead wool, is then driven in the space between the metal tube 12 of the pipe and the metal band 23 of the collar 21 and extends from the face 28 of the centering ring 22 to approximately flush with the face of the collar.

After the caulking material 31 is positioned in place the space 31 is filled with a plastic material 33, such as a cement mortar and the space 30 is filled with a plastic material 34 such as asphaltum.

As shown the thickness of the metal band 23 of the collar 21 is less than the thickness of the metal reinforcing tube 12 of the pipe 10. Thus as the pressure in a pipe line is increased to an excessive degree the collars 21 will expand before the associated pipes thus the caulking materials 29 and 32 will be squeezed between the metal tubes 12 and the metal bands 23 thereby forming a tighter joint as the pressure in the pipe line increases.

In Fig. 4, I have shown the metal band 23 of the collar 21 corrugated as at 35 between the end 25 of the collar and the centering ring 22. By providing the corrugations 35 the caulking material 29 is locked to the collar 21 and will not slip thereon when the pipes expand or contract. The metal tube 12 of the pipe engaging the caulking 29 may slip on the outer face of the caulking 29, and the tube 12 of the pipe engaging the caulking 32 may slip on the outer face of the caulking 32 and the inner face of the caulking 32 may slip on the outer face of the metal band 23 of the collar 21.

By painting the surfaces 18 and 19 of the pipes and the end faces of the collar 21, the collar does not adhere to adjacent pipes or the filling material 33 so that the pipe sections move practically independently of the collars.

The end 15 of the inner layer of concrete preferably includes a configuration such as indicated at 36 which when the filling material 33 is positioned in the space 31 prevents accidental dislodgment of the filling material. The ends 17 and 20 of the outer layer of concrete 13 preferably include configurations as indicated at 37 and 38, respectively, which when the filling material 34 is positioned in the space 30 prevents accidental dislodgment of the filling material 34.

In Fig. 5 the metal reinforcing tube 12 is shown as of approximately the same thickness as the thickness of the metal band 23 of the collar 21 with metal reinforcing bands 40 positioned over the tube 12 adjacent the ends thereof. The reinforcing bands 40 may be secured to the metal tube 12 by welding or riveting it thereto. In Fig. 5, I have further shown the metal band 23 of the collar 21 as corrugated throughout its entire length as indicated at 41. Thus both the caulkings 29 and 32 are locked to the collar 21 and can not slip on the metal band 23 but the pipe tubes 12 are free to slip on the outer surfaces of the caulking materials.

In Fig. 6 the metal reinforcing tube 12 is shown as of less thickness than the thickness of the metal band 23 of the collar 21 with metal end rings 42 of greater thickness than the thickness of the metal collar band 23 butt welded thereto. Furthermore, in Fig. 6, I have shown the metal band 23 of the collar 21 corrugated throughout its entire length as indicated at 43 similar to the collar shown in Fig. 5. Adjacent the outer ends of the metal end rings I have shown corrugated portions as indicated at 44. Thus when two sections of pipe are joined together both the caulking materials 29 and 32 are locked both to the metal band 23 of the collar 21 and to the metal end rings 42 of the pipes. With this construction when the pipes contract the caulking materials 29 and 32 are stretched and when the pipes expand the caulking materials 29 and 32 are compressed.

In Fig. 7 the full length metal reinforcing tube 12 is replaced by spaced metal reinforcing tubes 45 positioned one adjacent each end of the pipe and connected by a metal wire reinforcing cage 46 which is welded at each end to the metal end tubes 45. Adjacent the outer ends of the metal tubes 45, I provide corrugated portions 47 similar to the corrugated portions 44 of the end rings 42 in Fig. 6. The thickness of the metal end tubes 45 is greater than the thickness of the metal band 23 of the collar 21.

In Fig. 7, I have shown the metal band 23 of the collar 21 as plane throughout its entire length as indicated at 48. With this arrangement the caulking materials 29 and 32 are locked to the pipes and move therewith slipping on the outer surface of the metal band 23 of the collar 21 as the pipes expand or contract.

From the foregoing it will be apparent that various types of construction may be used to make the metal reinforcing tube of the pipe heavier than the metal band of the collar and that different portions of the pipe tube or the collar band may be corrugated to lock the packing material thereto.

In Fig. 8, I have indicated a modified form of pipe embodying the features of my invention generally at 50. As shown the pipe 50 includes a metal reinforcing tube 52 embedded between an outer layer of concrete 53 and an inner layer of concrete 54. At one end of the pipe the inner layer of concrete 54 is set back from the end of the metal tube 52 as indicated at 55. The end of the outer layer of concrete 53 adjacent the end 15 of the inner layer extends to the end of the metal tube 52 as indicated at 57. The outer layer of concrete 53 opposite the end 57 extends to the end of the metal tube 52 as indicated at 58.

Adjacent the end 58 of the pipe I provide a metal collar 60 which is of less external diameter than the internal diameter of the metal tube 52 and of greater internal diameter than the internal diameter of the pipe. The metal collar 60 is positioned in the pipe with a portion thereof projecting inwardly from the adjacent end of the tube 52 and a portion thereof projecting beyond the end of the tube 52. Outwardly from the metal collar 60 the inner layer of concrete 54 terminates at the inner end of the metal collar 60 as indicated at 61 and inwardly from the collar 60 the inner layer of concrete 54 extends to the outer end of the metal collar 60 as indicated at 62. Adjacent the inner end of the metal collar 60, I secure thereto by welding a metal wire cage 63 which is shown as extending to adjacent the end 55 of the inner layer of concrete in which it is embedded.

Positioned on the metal collar 60, I provide a centering ring 65 which may be made of metal or concrete. A caulking material 66, such as lead wool, is positioned in the space between the metal collar 60 and the metal tube 52 between the end 61 of the inner layer of concrete and the adjacent end of the tube 52.

In forming the pipe 50 the metal reinforcing tube 52, the metal collar 60 and its associated cage 63 together with the caulking 66 and the centering ring 65 are positioned in a mold and then the inner and outer layers of concrete are poured in place. When two sections of the pipe 50 are joined the metal tube 52 at the end 57 of the pipe overhangs the protruding portion of the metal collar 60 and the end 57 of the outer layer of concrete 53 is spaced from the end 58 of the outer layer of concrete of the adjoining pipe to form a chamber 67 and the end 55 of the inner layer of concrete 54 is spaced from the end 62 of the inner layer of concrete of the adjoining pipe to form a chamber 68. A caulking material 69 such as lead wool is then driven in the space between the collar 60 and the metal tube 52 of the adjoining pipe and extends from the centering ring 65 to approximately the end of the collar 60. After the caulking material 69 is positioned in place the chamber 68 is filled with a plastic material 70 such as a cement mortar and the chamber 67 is filled with a plastic material 71 such as asphaltum. As shown the thickness of the metal reinforcing tube 52 is greater than the thickness of the metal collar 60 for the same purpose as previously described in connection with the tube 12 and the collar band 23 of the device 10. As shown adjacent the metal collar 60 the metal tube 52 includes a corrugated portion as indicated at 72 and adjacent the inner end of the metal collar 60, I provide a similarly corrugated portion 73. Thus the packing material 66 is locked to the metal tube 52 by the corrugations 72 thereof and locked to the metal collar 60 by the corrugations 73 thereof. With this construction upon expansion or contraction of the pipes the slippage occurs on the outer and inner surfaces of the packing 69. It will be understood however that the metal collar 60 may be corrugated adjacent both ends and the metal tube may be corrugated adjacent both ends to form various combinations of points at which the packing material is locked.

From the foregoing description it will be apparent that I have provided an improved concrete pipe and pipe joint which can be economically manufactured and which is simple in construction, highly efficient in use and which allows for expansion and contraction without liability of leakage.

Having thus described my invention, I claim:

1. A length of concrete pipe having a metal reinforcing tube embedded therein, the ends of said pipe including undercut portions within said metal tubes, a collar member arranged at one end of said pipe and including an external metal band, the external diameter of said band being less than the internal diameter of the adjacent undercut portion of said pipe, a packing material positioned on said band and filling the spaces between said collar band and said pipe tube.

2. A conduit including two lengths of pipe placed end to end, the adjacent ends of said pipes including annular undercut portions, a collar arranged between the ends of said pipes, the external diameter of said collar being less than the inside diameter of said undercut portions, a separately formed ring member on said collar intermediate the length thereof, the ring member having an outer diameter approximately equalling the inner diameter of the undercut portions, and caulking material positioned on each side of said ring member and filling the spaces between said collar and the adjacent surfaces of said undercut portions of said pipes.

3. A concrete pipe length end, the adjacent ends of said pipes including an undercut portion at one end, a collar, said collar having one portion arranged in one of said undercut portions, the external diameter of said collar being less than the inside diameter of said undercut portions to provide an annular space about the collar, a ring member on said collar intermediate the length thereof, caulking material positioned in said annular space and filling the spaces between said collar and the surface of said undercut portion of said length.

4. A conduit including two lengths of pipe placed end to end, said lengths of pipe having their adjacent inner portions undercut to form a pocket at the joint between the two lengths, a collar fitted in said pocket, said collar having an internal diameter substantially equal to the internal diameter of said pipe length and said collar having an outer diameter less than the outer diameter of the pocket to provide a receptacle, a centering ring mounted on said collar at the juncture of the outer portions of said lengths and caulking material on said collar at each side of said centering ring and a filling between the inner ends of said pipe lengths.

5. A conduit including two lengths of pipe placed end to end, the adjacent ends of said pipes including cylindrical undercut portions, a collar arranged between the ends of said pipes, said collar having one end engaging one end of the undercut portion, the external diameter of said collar being less than the inside diameter of said undercut portions, the other end of said collar being spaced from the adjacent undercut portion of said pipes, caulking material positioned about said collar in the space between said collar and the inner cylindrical surfaces of said undercut portions of said pipes.

6. A conduit including two lengths of pipe placed end to end, the adjacent ends of said pipes including undercut portions, a collar arranged between the ends of said pipes, said collar being shorter than the combined length of the undercut portions, the external diameter of said collar being less than the inside diameter of said undercut portions, a ring member on said collar intermediate the length thereof, and caulking material positioned on each side of said ring member and filling the spaces between said collar and the surfaces of said undercut portions of said pipes.

7. A conduit including two lengths of pipe placed end to end, the adjacent ends of said pipes including undercut portions, a collar arranged between the ends of said pipes, the external diameter of said collar being less than the inside diameter of said undercut portions to provide an annular space about the collar, said collar being arranged in said undercut portions of said pipes and caulking material at the end of said collar and filling the annular space between said collar and the surfaces of said undercut portions of said pipes, and means to prevent longitudinal movement of said packing material.

8. A conduit including two lengths of pipe placed end to end, the adjacent ends of said pipes including undercut portions, a collar between the ends of said pipes, the external diameter of said collar being less than the inside diameter of said undercut portions, centering means on said collar intermediate the length thereof, said collar being arranged in said undercut portions of said pipes and caulking material positioned about said centering means and filling the spaces between said collar and the surfaces of said undercut portions of said pipes, and means to prevent longitudinal movement of said caulking material.

9. A conduit comprising two lengths of concrete pipe positioned end to end, each of said pipes having a metal reinforcing tube embedded therein, the adjacent ends of said pipes including undercut portions within said metal tubes, a collar member arranged between the ends of said pipes and including an external metal band, the external diameter of said band being less than the internal diameter of the undercut portions of said pipes, a packing material positioned on said band and filling the space between said collar band and said pipe tubes, the wall of said pipe tubes being of greater thickness than the wall of said collar band.

10. A conduit including two lengths of pipe placed end to end, the adjacent ends of said pipes including undercut portions, a collar between the ends of said pipes, the external diameter of said collar being less than the inside diameter of said undercut portions, centering means associated with said collar, said collar being arranged in said undercut portions of said pipes, caulking material filling the space between said collar and the surfaces of said undercut portions of said pipes, and means associated with said undercut portions of said pipes to prevent longitudinal movement of said packing material relative thereto.

11. A conduit including two lengths of pipe placed end to end, the adjacent ends of said pipes including undercut portions, a collar between the ends of said pipes, the external diameter of said collar being less than the inside diameter of said undercut portions, said collar being arranged in said undercut portions of said pipes, caulking material filling the space between said collar and the surfaces of said undercut portions of said pipes and means on said collar to prevent longitudinal movement of said packing material relative to said collar.

12. A conduit comprising two lengths of concrete pipe positioned end to end, each of said pipes having a metal reinforcing tube embedded therein, the adjacent ends of said pipes including undercut portions within said metal tubes, a collar member arranged between the ends of said pipes and including an external metal band, the external diameter of said band being less than the internal diameter of the undercut portions of said pipes, a ring member positioned on said collar intermediate the ends thereof, the outer diameter of said ring being approximately the same as the inner diameter of said metal pipe tubes, a packing material positioned on each side of said ring member and filling the space between said collar band and said pipe tubes, the wall of said pipe tubes being of greater thickness than the wall of said collar band, means on said collar to prevent longitudinal movement of said packing material relative to said collar and means associated with the undercut portions of said pipes to prevent longitudinal movement of said packing material relative to said pipes.

13. A conduit including two lengths of pipe placed end to end, the adjacent ends of said pipes including undercut portions, a collar between the ends of said pipes, the external diameter of said collar being less than the inside diameter of said undercut portions, said collar being arranged in said undercut portions of said pipes and caulking material filling the space between said collar and the surfaces of said undercut portions of said pipes, means on said collar to prevent longitudinal movement of said packing material relative to said collar and means associated with the undercut portions of said conduits to prevent longitudinal movement of said packing material relative to said undercut portions.

14. A conduit comprising two lengths of concrete pipe positioned end to end, each of said pipes having a metal reinforcing tube embedded therein, the adjacent ends of said pipes including undercut portions within said metal tubes, a collar member arranged between the ends of said pipes and including an external metal band, the external diameter of said band being less than the internal diameter of the undercut portions of said pipes, a ring member positioned on said collar intermediate the ends thereof, the outer diameter of said ring being approximately the same as the inner diameter of said metal pipe tubes, a packing material positioned on each side of said ring member and filling the space between said collar band and said pipe tubes, the wall of said pipe tubes being of greater thickness than the wall of said collar band, said pipe tubes having corrugated portions engaging said packing.

15. A pipe including a metal reinforcing member embedded between an outer layer of molded material and an inner layer of molded material, said reinforcing member and said outer layer of molded material extending at each end beyond said inner layer of molded material, a collar, said collar including a metal band having a ring of molded material therein, said collar being of less external diameter than the internal diameter of said reinforcing member and said metal band of said collar being of less thickness than said reinforcing member, said collar being positioned in one end of said pipe with one face thereof engaging the adjacent end of said inner layer of molded material, and the opposite face thereof protruding beyond its said pipe, a packing material, said packing material being positioned in the space between said collar band and said pipe reinforcing member and between the adjacent end of said inner layer of molded material and said ring member.

16. A conduit including two pipes positioned end to end, each of said pipes including a metal reinforcing member embedded between an outer layer of molded material and an inner layer of molded material, said reinforcing member and said outer layer of molded material extending at each end beyond said inner layer of molded material, a portion of the protruding section of said reinforcing member at each end being corrugated, a collar, said collar including a metal band having a ring of molded material therein, said collar being of less external diameter than the internal diameter of said reinforcing member and said metal band of said collar being of less thickness than said reinforcing member, said collar being positioned in one of said pipes with one face thereof engaging the adjacent end of said inner layer of molded material, and the opposite face thereof protruding beyond its associated pipe, a packing material, said packing material being positioned in the space between said collar band and said pipe reinforcing member and between the adjacent end of said inner layer of molded material and said ring member, said protruding end of said collar being positioned in the other of said pipes with the end spaced from the adjacent end of said inner layer of molded material of said other pipe, a second packing material, said second packing material being positioned between said metal collar band and said pipe reinforcing member of said other pipe and between said ring member and said protruding end of said collar, the space between said collar and said adjacent end of said other pipe being filled with a plastic material, said collar band adjacent said first packing material including a corrugated portion adapted to lock said first packing material to said collar band.

17. A conduit including two pipes positioned end to end, each of said pipes including a metal reinforcing member embedded between an outer layer of molded material and an inner layer of molded material, said reinforcing member and said outer layer of molded material extending at each end beyond said inner layer of molded material, a collar, said collar including a metal band having a ring of molded material therein, said collar being of less external diameter than the internal diameter of said reinforcing member and said metal band of said collar being of less thickness than said reinforcing member, said collar being positioned in one of said pipes with one face thereof engaging the adjacent end of said inner layer of molded material, and the opposite face thereof protruding beyond its associated pipe, a packing material, said packing material being positioned in the space between said collar band and said pipe reinforcing member and between the adjacent end of said inner layer of molded material and said ring member, said protruding end of said collar being positioned in the other of said pipes with the end spaced from the adjacent end of said inner layer of molded material of said other pipe, a second packing material, said second packing material being positioned between said metal collar band and said pipe reinforcing member of said other pipe and between said ring member and said protruding end of said collar, the space between said collar and said adjacent end of said other pipe being filled with a plastic material, said collar bands adjacent said packing materials including a corrugated portion adapted to lock said packing materials to said collar band.

BOZIDAR J. UKROPINA.